Figures 18, 19:
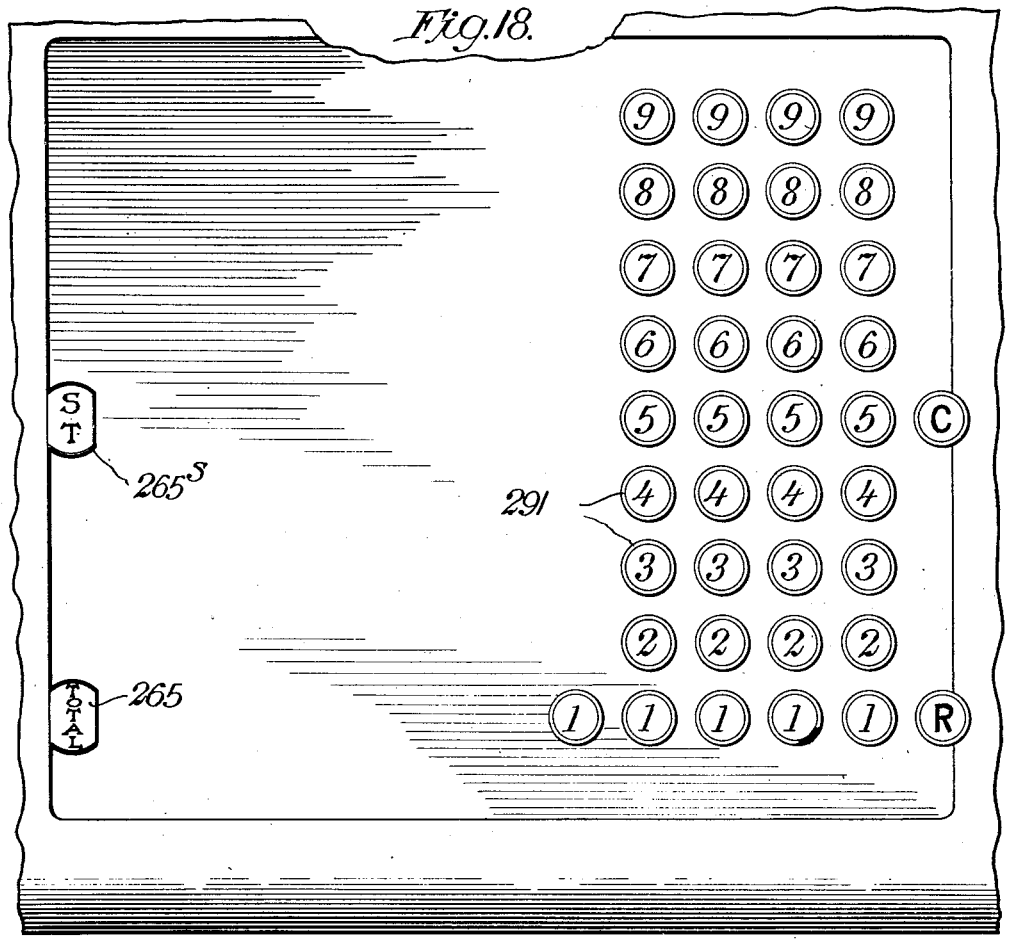

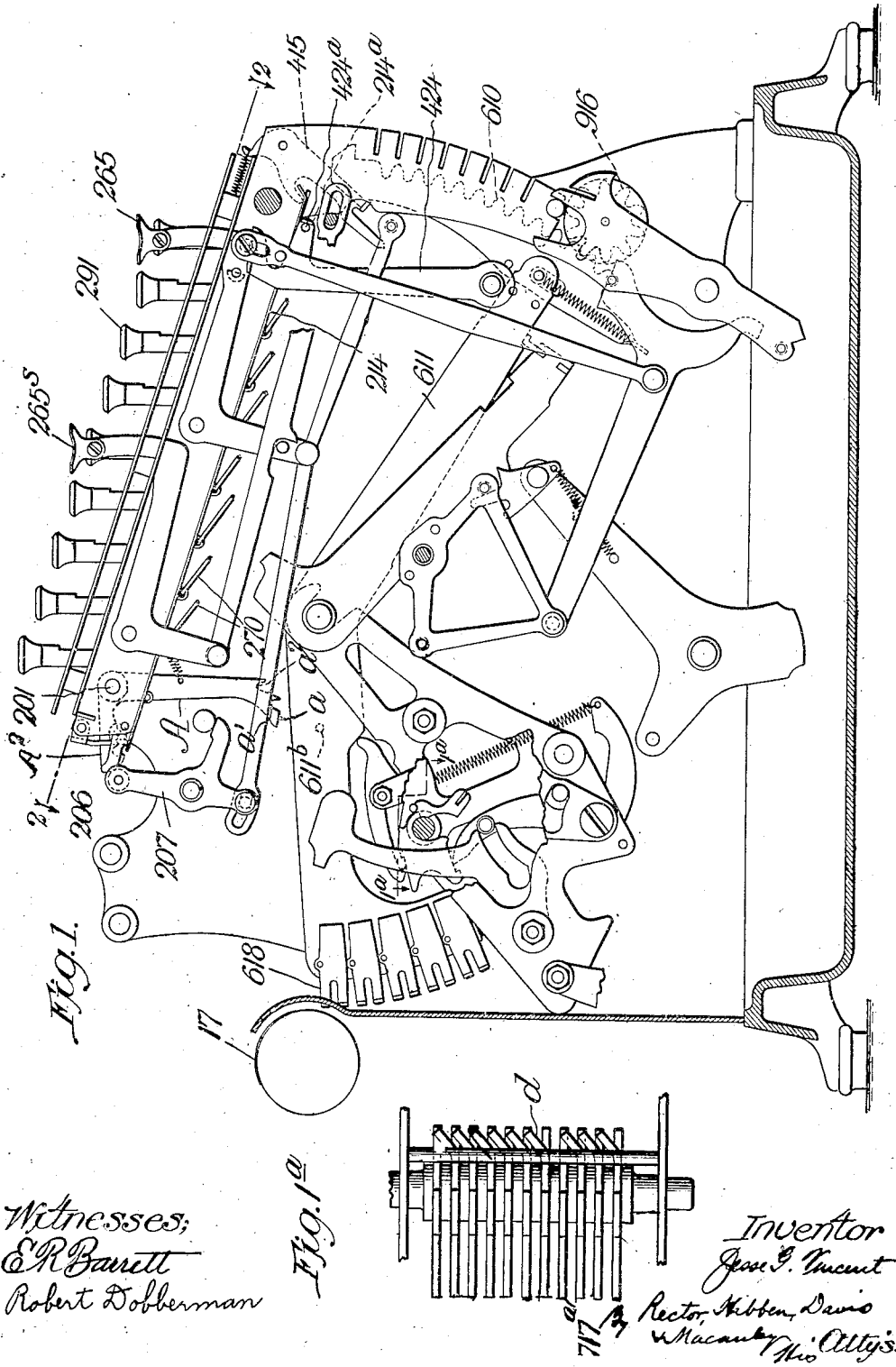

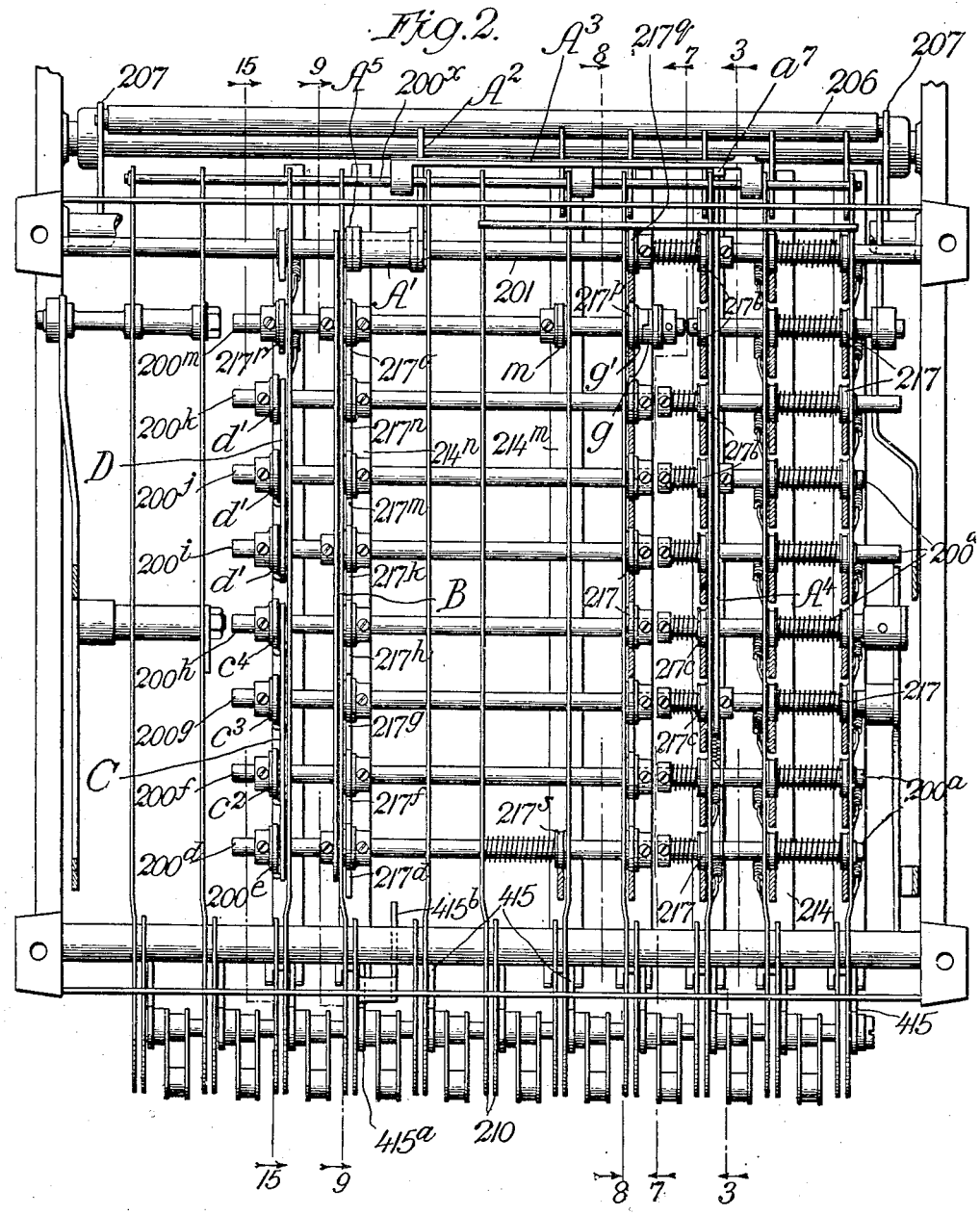

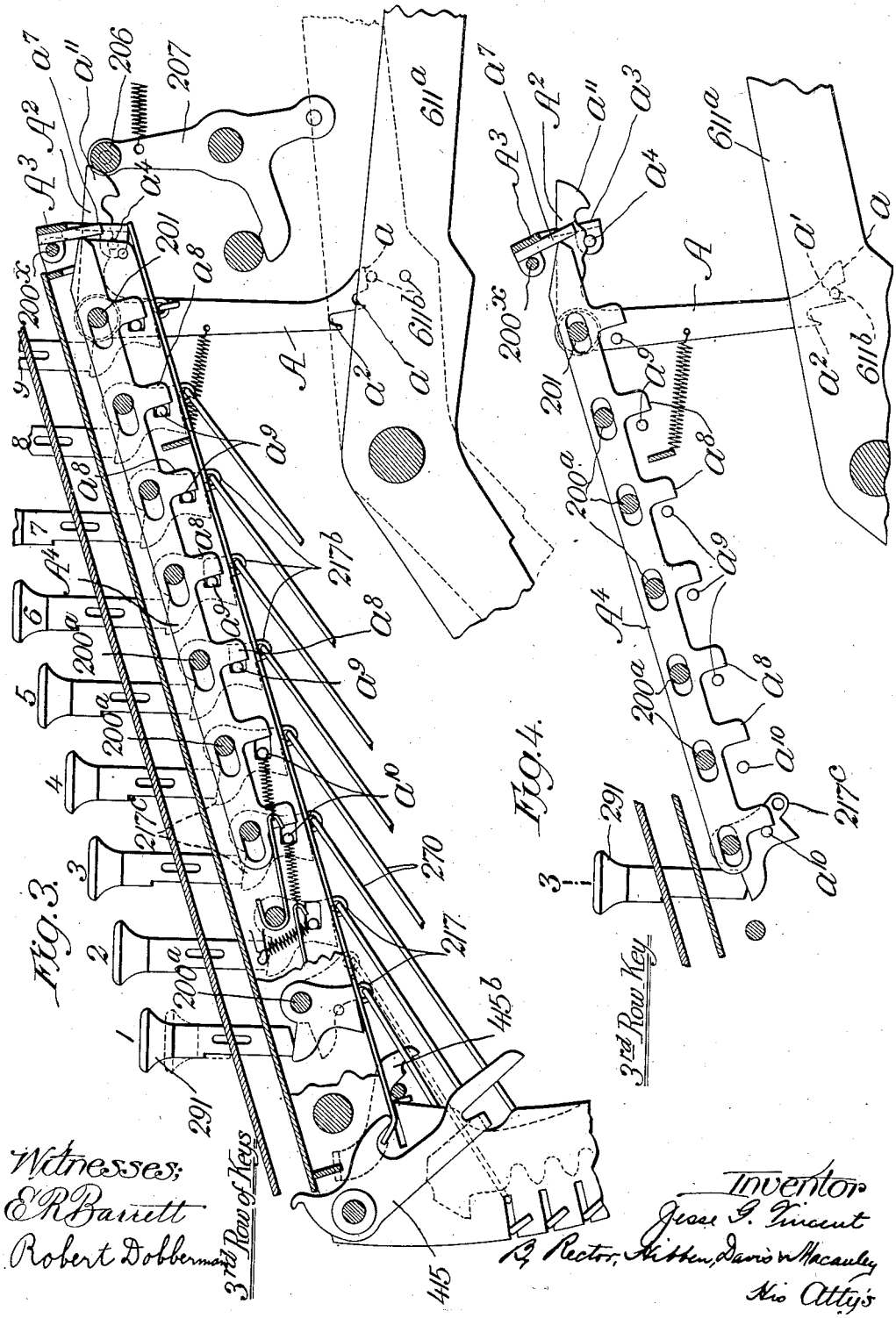

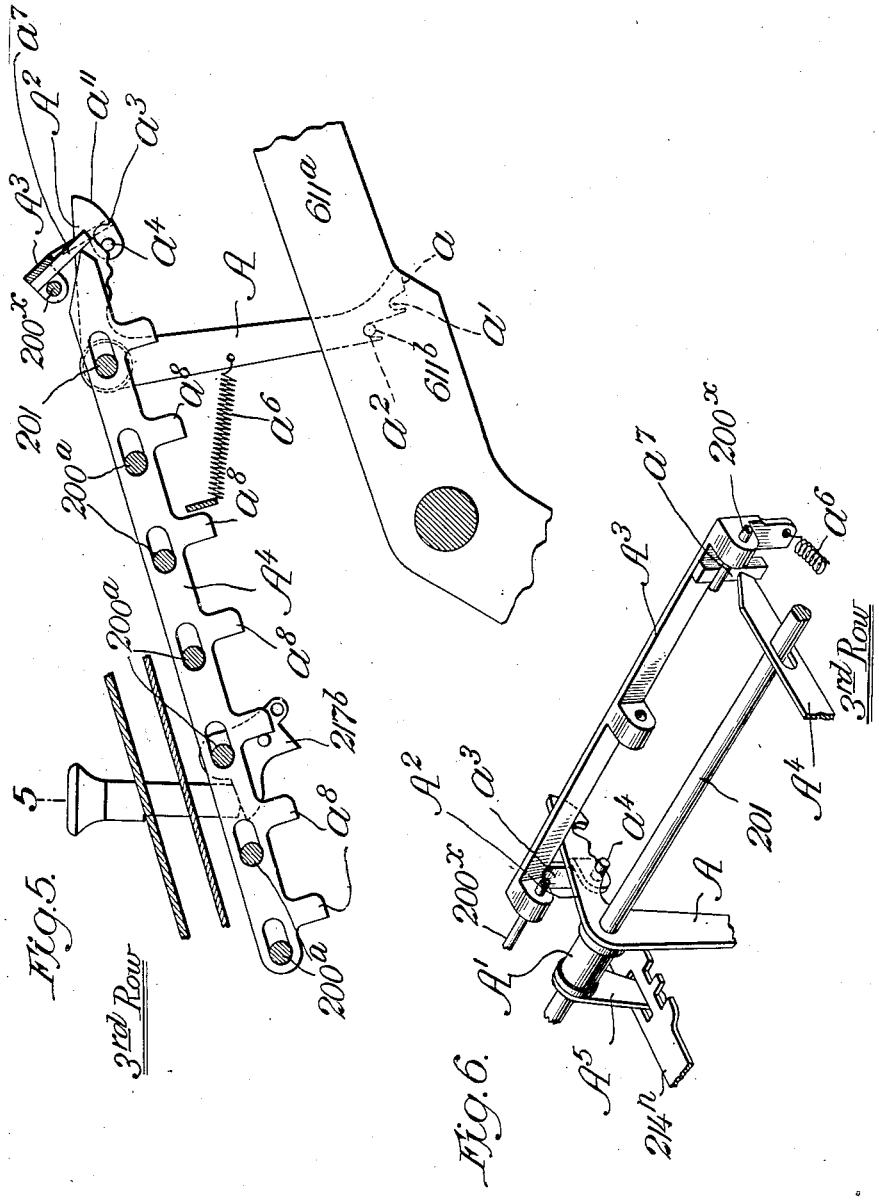

J. G. VINCENT.
ADDING AND LISTING MACHINE.
APPLICATION FILED SEPT. 16, 1910.
1,157,465.
Patented Oct. 19, 1915.
9 SHEETS—SHEET 5.
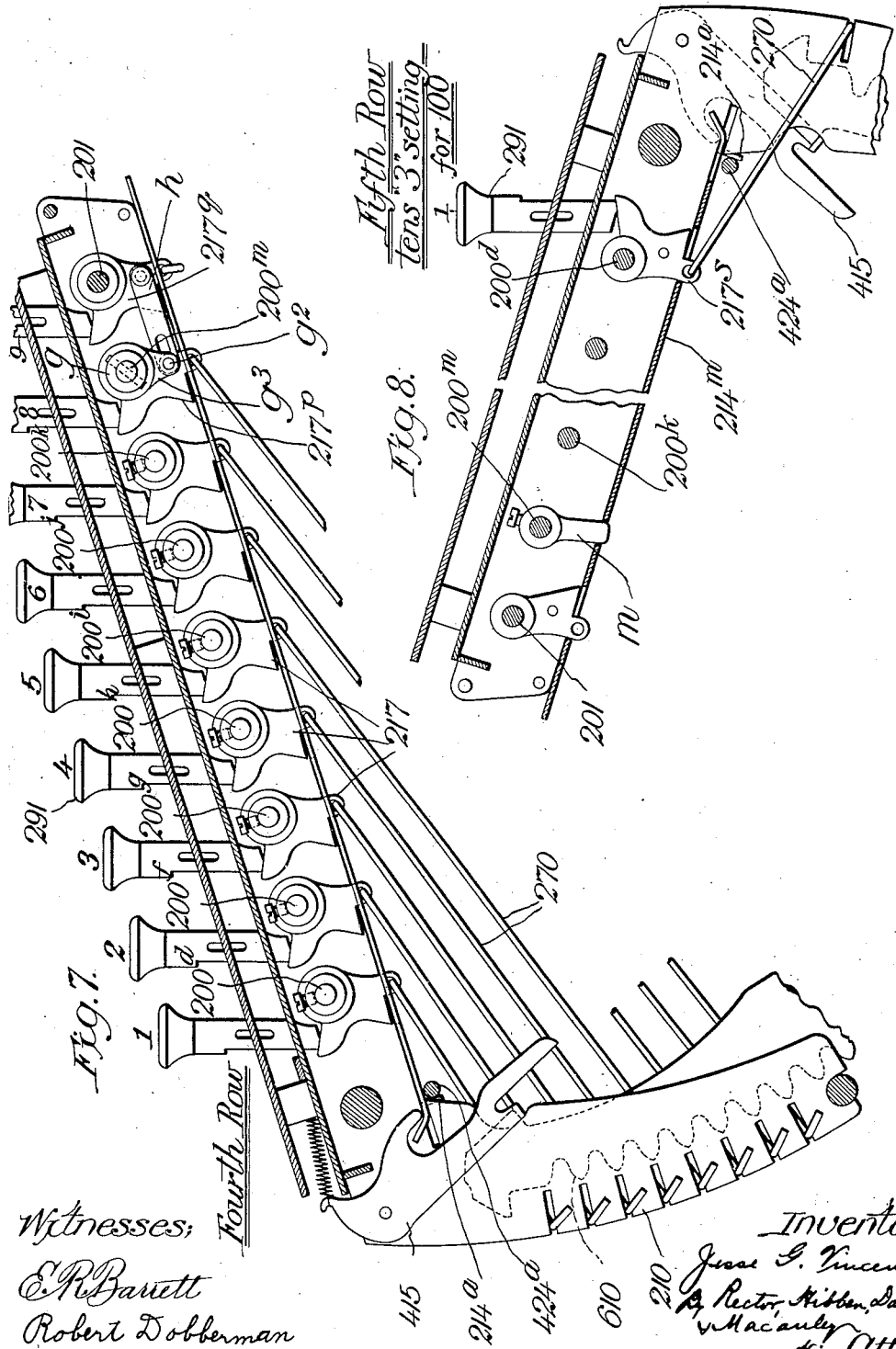

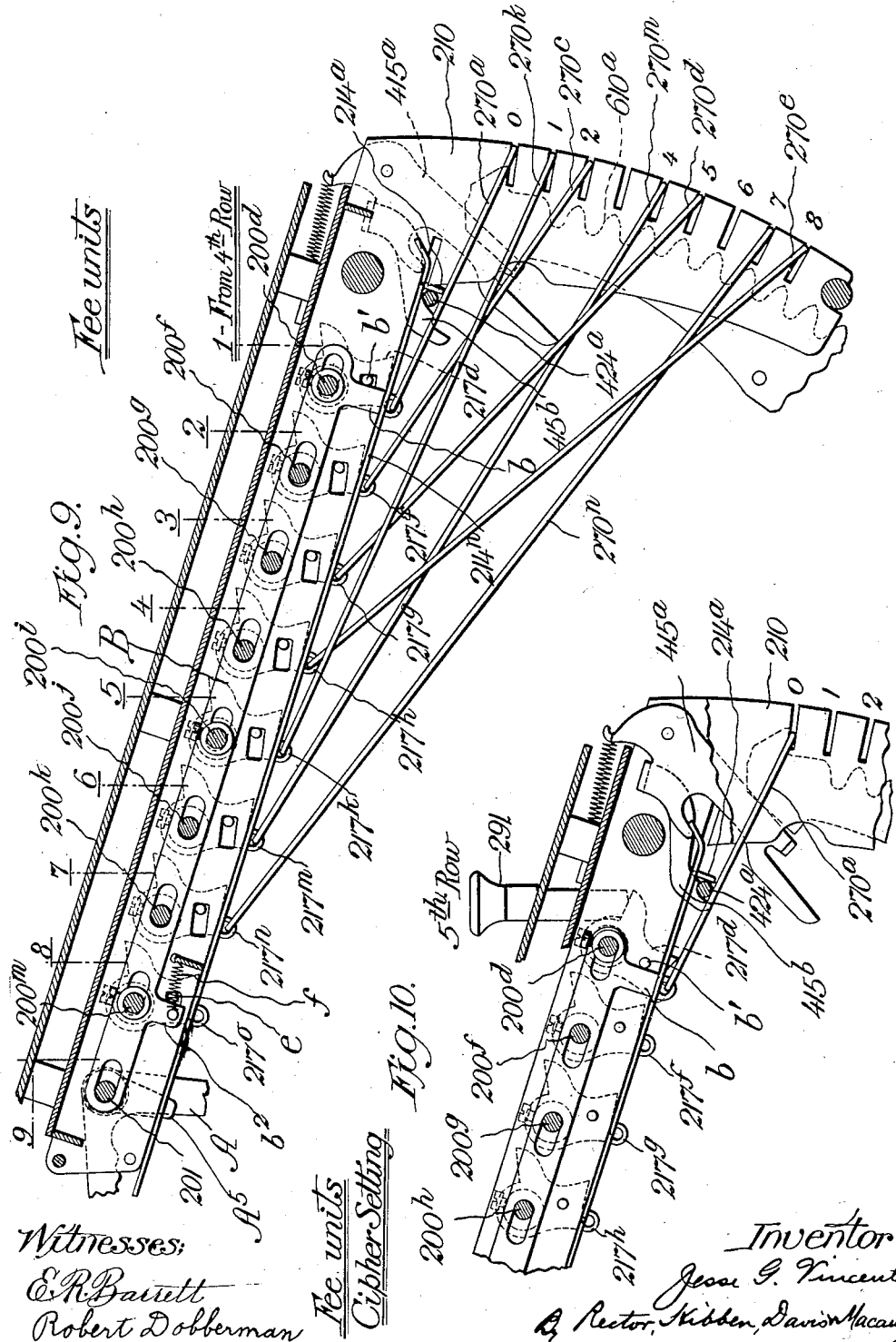

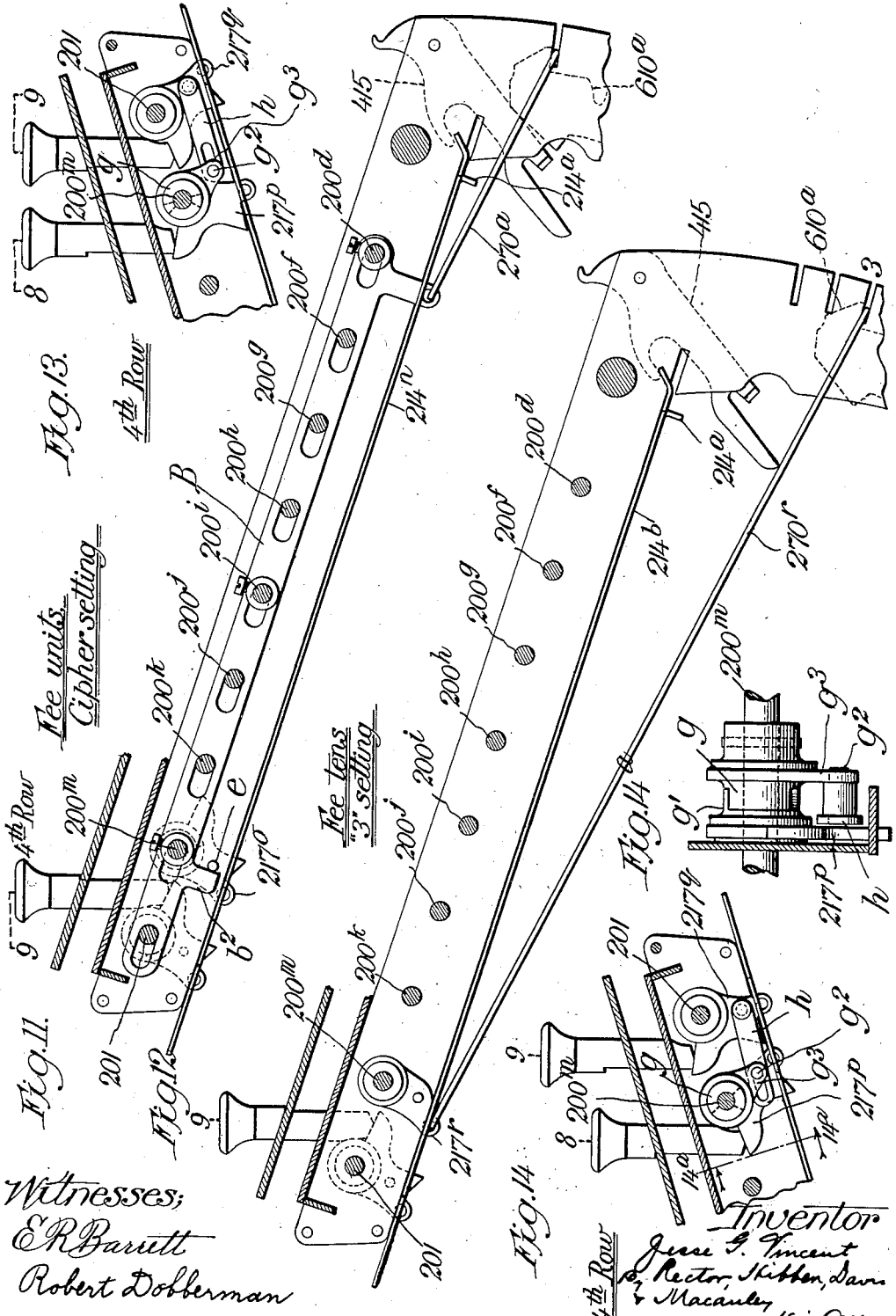

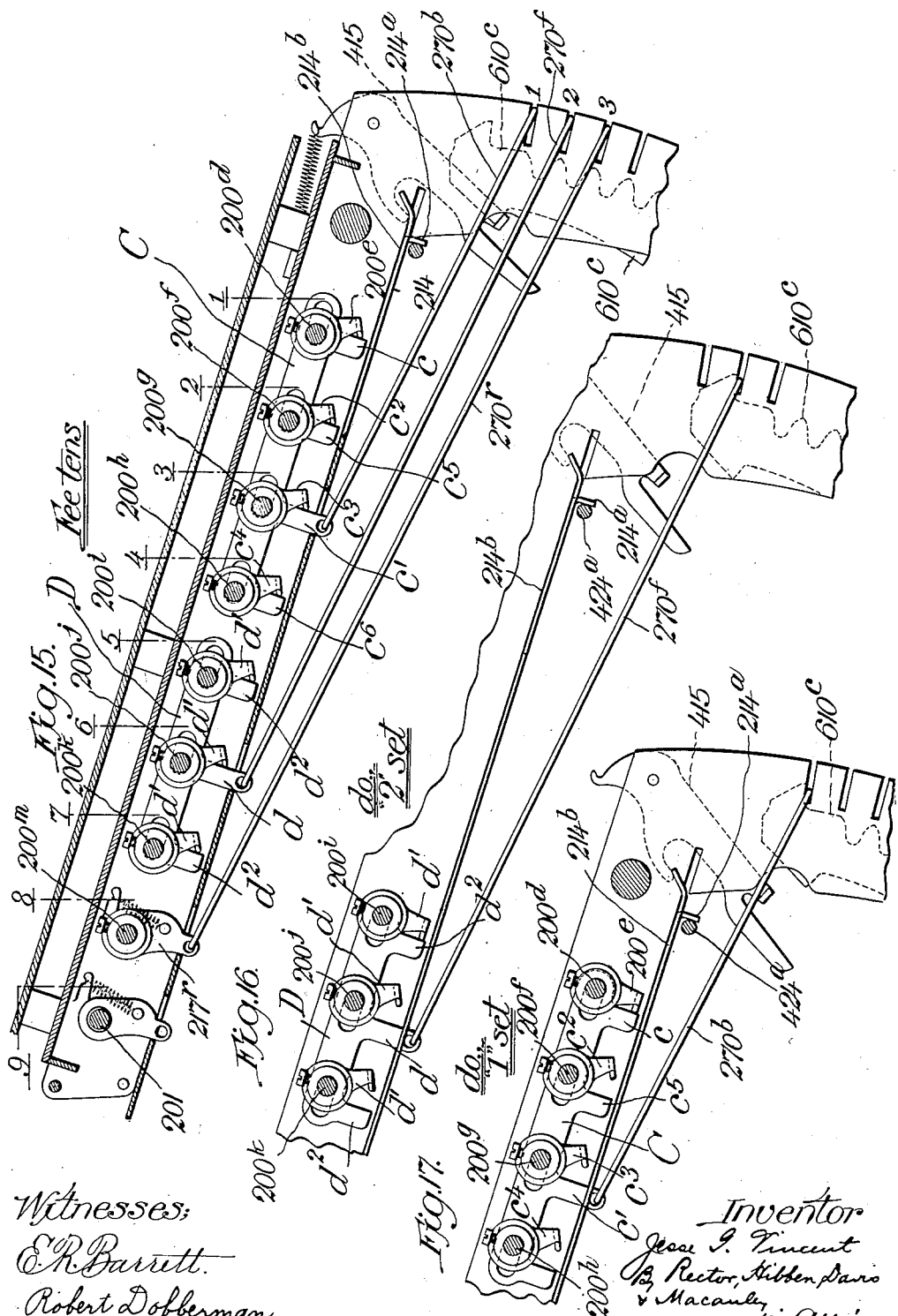

J. G. VINCENT.
ADDING AND LISTING MACHINE.
APPLICATION FILED SEPT. 16, 1910.

1,157,465.

Patented Oct. 19, 1915.
9 SHEETS—SHEET 9.

| | |
|---:|---:|
| 3 | 1 |
| 3 | 2.99 |
| 5 | 3.00 |
| 5 | 4.99 |
| 8 | 5.00 |
| 8 | 9.99 |
| .10 | 10.00 |
| .10 | 19.99 |
| .12 | 20.00 |
| .12 | 29.99 |
| .15 | 30.00 |
| .15 | 39.99 |
| .18 | 40.00 |
| .18 | 49.99 |
| .21 | 50.00 |
| .21 | 59.99 |
| .24 | 60.00 |
| .24 | 69.99 |
| .27 | 70.00 |
| .27 | 79.99 |
| .30 | 80.00 |
| .30 | 89.99 |
| .30 | 90.00 |
| .30 | 99.99 |
| .30 | 100.00 |
| 4.36 | 1115.89 |

Witnesses:
E. R. Barrett
Robert Dobberman

Inventor
Jesse G. Vincent
By Rector, Hibben, Davis & Macauley
His Attys.

UNITED STATES PATENT OFFICE.

JESSE G. VINCENT, OF DETROIT, MICHIGAN, ASSIGNOR TO BURROUGHS ADDING MACHINE COMPANY, OF DETROIT, MICHIGAN, A CORPORATION OF MICHIGAN.

ADDING AND LISTING MACHINE.

1,157,465.          Specification of Letters Patent.          Patented Oct. 19, 1915.

Application filed September 16, 1910. Serial No. 582,330.

*To all whom it may concern:*

Be it known that I, JESSE G. VINCENT, a citizen of the United States, residing at Detroit, in the county of Wayne and State of Michigan, have invented certain new and useful Improvements in Adding and Listing Machines, of which the following is a specification.

The object of the present invention is to equip a machine having the function of registering or recording or both with means whereby simultaneously with the performance of such functions there will be recorded or registered or both varying amounts bearing relation to those handled in the ordinary manner *e. g.*, such as varying governmental fees bear to the amounts of money orders. In the present instance the invention is set forth as applied to that type of adding and listing machine which employs a number of denominational rows or orders of amount keys numbered 1 to 9 and in such case manipulative keys are present only for the setting up of the amounts such as might and in the example given do represent values or amounts of money orders, there being no keys requiring manipulation for the setting up of the varying amounts such as might and in the example herein do represent the money order fees, but the selection of controlling devices, stops or indexing means whereby to determine the proper related amount or fee takes place automatically governed according to what keys are manipulated for setting up the value item. It will be understood that the fee items will be listed opposite or in horizontal alinement with the related value items and that both will be accumulated and that a total of the fee items can be printed as a footing along with a total of the value items.

In the drawings which accompany and form part of this specification Figure 1 represents in left side elevation a machine of the well-known Burroughs type having my present invention embodied therein, certain parts being broken away to disclose others in rear thereof and the machine being represented as at normal; Fig. 1ª is a detail plan view taken on the line 1ª—1ª of Fig. 1; Fig. 2 is a horizontal section taken substantially on the line 2—2 of Fig. 1; Fig. 3 is a vertical section of a portion of the machine taken substantially on the line 3—3 of Fig. 2; Fig. 4 is a somewhat similar section not including as many parts and showing a changed relation due to depression of the "3" value key of the third or hundreds row or order of keys, and a partial operation of the machine; Fig. 5 is a view similar to Fig. 4 but illustrating the effect of depressing the "5" value key of said row or order; Fig. 6 is a perspective view of certain parts which appear in section and in elevation in Figs. 4 and 5, also some associated parts; Fig. 7 is a vertical section of part of the machine taken substantially on the line 7—7 of Fig. 2; Fig. 8 is a vertical section of a portion of the machine taken substantially on the line 8—8 of Fig. 2, with some abbreviation to economize space; Fig. 9 is a vertical section taken subtantially on the line 9—9 of Fig. 2, being on the same order of illustration as Figs. 3 and 7; Fig. 10 is a view similar to Fig. 9 though not being quite as extensive and further differing in showing a changed relationship of parts due to depression of the single key in the fifth or hundred dollar order; Fig. 11 is a view somewhat similar to Figs. 9 and 10, illustrating the same stop device set as in Fig. 10 but as the result of the depression of a different key than there illustrated, to-wit the 9 key of the fourth or thousands row or order; Fig. 12 is a view of much the same character but taken on a different section line to illustrate the effect of depressing said "9" value key in setting a stop of a different series from that shown set in Fig. 11; Fig. 13 corresponds with the right-hand portion of Fig. 7 showing a changed relationship of parts brought about by depression of said "9" value key; Fig. 14 is a view similar to Fig. 13 but illustrating a still different relationship of parts produced by depression of the "8" value key of the same row or order; Fig. 14ª is a transverse sectional elevation taken on the line 14ª—14ª of Fig. 14; Fig. 15 is a vertical section taken substantially on the line 15—15 of Fig. 2; Fig. 16 is a similar view but not so extensive and illustrating the effect of depressing the "5" value key of the fourth row or order; Fig. 17 is a similar view illustrating the effect of depressing the "1" value key of said row or order; Fig. 18 is a top plan view of the keyboard of the machine; and Fig. 19 represents an example of work such as the machine is designed to accomplish.

In view of the large number of prior patents already issued and the extent to which the Burroughs machine has been marketed, it will not be necessary to give a detailed description of the machine proper though a number of familiar parts thereof will be designated to make clear how the new parts coöperate therewith in carrying out the present invention.

Referring first to Figs. 1 and 18 the reference numeral 291 designates depressible amount keys such as ordinarily employed in Burroughs machines, though in the present instance there are not rows of these keys extending from side to side of the keyboard or top panel of the machine but only five orders of keys and only a single key in the fifth order, as it is designed to list and register values to a maximum of $199.99. These five orders of keys occupy the right-hand portion of the keyboard or panel and the left-hand portion is left blank except as to protrusion thereabove of the usual total and sub-total keys 265 and 265$^s$. The mechanism connected with the latter is unchanged and such as appears in Patent No. 913,860, issued March 2, 1909, to Burroughs Adding Machine Company on my invention. For each order of said keys there is the usual segmental rack 610 normally detained by a latch 415 and carried by levers 611 with the usual provisions for transfer or carrying tens. The rear ends of the levers 611 carry segmental series of type plates of the usual kind such as those designated 618 in Fig. 1 and adapted to be driven against a roller platen 17 by hammer mechanism of the usual sort. While the machine will have the full complement of adding racks only the five directly associated with the amount keys serve as direct adding elements as to the value items, others in higher orders merely serving to extend the total and then certain similar racks farther to the left serving to add the fee items, their levers 611 setting up the fees in type. Preferably there will be still further racks, levers and adding wheels to the left for extending the fee total. The numeral 916 designates the accumulating pinions which are of the ordinary type and controlled as to engagement with and disengagement from the racks in the familiar manner. Inasmuch as two separate columns are to be printed,—one made up of fee items and the other of value items, the printing mechanism is permanently subdivided or split in the well-known manner, to-wit by omitting the overlapping tail $d$ of the latch 717$^a$ which belongs to the units order of the fee section or department of the machine. It will of course be understood that the overlapping tails provide for tripping of latches one by another from left to right for the purpose of filling in the ciphers and by the simple and familiar expedient above mentioned the printing of ciphers to the left of the highest digits in the valve items will be prevented.

In the matter of measuring movement of immediately associated racks to set up value items and prepare for the registering thereof, the keys 291 operate in the ordinary manner, each key operating upon a bell crank lever 217 and through it setting a stop wire 270, but in carrying out the present invention the keys have other functions to perform in that by their depression the racks for setting up and registering fees must also be controlled. The machine as here shown is specially adapted for the handling of money orders and it may be well to allude at the outset to the prevailing table of money order rates as illustrated in the example afforded by Fig. 19. As there appears the fee for money orders up to $3 is .03 and for $3 and up to $5 is 0.5, and for $5 and up to $10 is .08, and for $10 and up to $20 is .10, and for $20 and up to $30 is .12, and for $30 and up to $40 is .15, and for $40 and up to $50 is .18, and for $50 and up to $60 is .21, and for $60 and up to $70 is .24, and for $70 and up to $80 is .27, and for $80 and up to and including $100 is .30. It will be seen that this, besides calling for differential setting of the rack of the units order in the fee department of the machine, also calls for something in the nature of permutation in the simultaneous control of units and the tens rack of the fee department.

Referring now more particularly to Figs. 1 and 3 to 6, and treating for the present of the recording and registering of fees confined to the units order, it may be first stated that in this work the fee units rack, specially designated 610$^a$, is not positioned or indexed by the ordinary method of drawing in stop wires and inasmuch as withdrawal of the rack latch will not therefore occur in the ordinary way, special provision is made for releasing the fee units racks, to which end a specially constructed latch 415$^a$ is employed. It differs from the usual form of latch in having an extra rearwardly-extending bent arm or finger 415$^b$ which is adapted to be engaged by the cross-rod 424$^a$ of a bail 424 similar to that commonly employed in Burroughs machines, said cross-rod extending just in rear of a series of lips 214$^a$ on detent slide strips 214 of the usual type. It will be understood that whenever any amount key is depressed said bail will be swung rearward in the familiar way, but in the present instance the bail has the added function of lifting or withdrawing the special latch 415$^a$ to release the fee units rack 610$^a$. Preferably the finger 415$^b$ is notched to provide a seat for the cross-rod when the bail has been swung rearward, see Fig. 10. Now the positioning or indexing of this rack is done under control of the value keys of the first three rows or orders, though so long as the amount or value does not exceed $2.99, the keys play no active part in setting a stop for the rack but such stop is normally positioned to permit a three-step movement of the rack so that it will register the numeral 3 on the units fee wheel and so that the corresponding 3 type will be brought to the printing line. The stop member in question is in the form of a depending arm A secured to a sleeve A′ which is journaled on the cross-rod 201 which supports the rearmost transverse series of key bell crank levers such as those previously referred to under the designation 217, though a considerable number of the bell crank levers are especially equipped or modified in construction for the purposes of the present invention, as will be presently pointed out. The arm A is formed at its lower extremity as a foot $a$ standing in the path of a stud $611^b$ projecting from the fee units rack lever $611^a$. This is the normal condition and thus the measure of movement of this particular lever is provided for in the connection above mentioned, to-wit in the matter of recording and registering the fee of .03 for amounts up to but not including $3. It will be understood that in this connection the value keys, aside from or in addition to the performance of their customary functions, are required merely to displace or withdraw the special latch $415^a$.

The same stop arm A serves for indexing or determining the position of the type carrier $611^a$ and its rack, when the money order value or amount exceeds $2.99 and for anything above that up to but not including $5, for which the fee is .05, and the same thing is true as to amounts exceeding $4.99 and running up to but not including $10 for which the fee is .08. To this end the said stop arm has steps or shoulders at properly varying distances from the bottom of the foot $a$ and for purposes of insuring exact positioning and guarding against any possible derangement these steps or shoulders take the form of bases of notches $a'$ and $a^2$, either of which may be positioned in line with the stud $611^b$. The stop arm A has attached to it a contractile spring $a^5$ which constantly tends to swing the arm forward and this spring is normally restrained so that the arm will be positioned with the foot $a$ in line with said stud but the restraining means are adjustable or variable so as to provide for two other positions of said arm, one with the notch $a'$ in line with the stud $611^b$ and the other with the notch $a^2$ in line with said stud and these two positions are determined under control of the appropriate keys in the third row or order. Of course the 1 and 2 keys of this order have no effect to vary the position of said stop arm but the 3 and the 4 keys must each cause shifting forward of said arm to bring the notch $a'$ in line with the stud and the 5, 6, 7, 8 and 9 keys must each, when depressed, cause further forward shifting of the said arm to bring the notch $a^2$ in line with the stud. This is effected through the following described mechanism: The stop arm has a rearwardly-projecting branch $A^2$ with a fluted under-edge forming a series of cam rises and stepped shoulders, and there is pivoted upon a cross-rod $200^x$ a bail $A^3$ having a depending arm $a^3$ at the left-hand end and a pin or stud $a^4$ on said arm extending under the branch $A^2$ and engaging the fluted edge thereof. Said stud normally engages the first of the series of steps or shoulders and so normally positions the stop arm A with its foot $a$ in the path of the stud $611^b$. A spring $a^6$ is applied to the bail and tends to swing the same forward but is not strong enough to overcome the spring $a^5$ and carry the stud forward over the cam rise just in front of it, so that said stud remains seated in the notch or depression between that cam rise and the next one to the rear as illustrated in Fig. 3. The bail has a depending lug $a^7$ near its right-hand end and this lug is engaged by the nose at the rear end of a slide bar $A^4$ which for guiding purposes is multi-slotted to engage cross-rods $200^a$ on which the bell cranks associated with the 3, 4, 5, 6, 7, 8 and 9 keys are journaled. This slide bar has a series of depending lugs $a^8$ which extend in rear respectively of studs $a^9$ on the bell cranks $217^b$ associated with the 5, 6, 7, 8 and 9 keys, and pins or studs $a^{10}$ on the bell crank levers $217^c$ associated with the 3 and 4 keys. The studs $a^9$ normally lie close to the forward edges of the lugs but the studs $a^{10}$ are correspondingly spaced from the associated lugs. The result is that the 3 and the 4 keys each move the slide bar $A^4$ the same distance rearward but not until there has been some lost motion, whereas the 5, 6, 7, 8 and 9 keys each move the said slide bar the same distance rearward but to a greater extent than either the 3 or the 4 key. The rearward movement of the slide bar produced by depression of either the 3 or the 4 key causes the nose at the rear end of said bar to thrust against the lug $a^7$ to an extent sufficient for swinging the bail $A^3$ rearward to force its stud $a^4$ over the second cam rise of the branch $A^2$, as illustrated in Fig. 4, the stud then seating in the depression between that cam rise and the next one to the rear. The effect is to rock the branch $A^2$ slightly upward and correspondingly swing the stop arm A rearward to bring its notch $a'$ in line with the stud $611^b$ so that upon operation of the machine the lever $611^a$ will be properly positioned for setting the 5 type and carrying the rack $610^a$ down five steps. The farther rearward movement of the slide bar $A^4$, produced by depression of any one of the higher keys takes the stud $a^4$ back over the third cam rise of the branch $A^2$, as illustrated in Fig. 5, thereby rocking said branch farther upward and carrying the stop arm A farther rearward so as to position its upper notch $a^2$ over the stud $611^b$ and therefore provide for setting up the 8 type and lowering the rack eight spaces. For the purpose of restoring the stop arm to its normal position at the conclusion of any operation, the branch $A^2$ is extended rearward and formed with a rounded terminal portion $a^{11}$ which engages the cross-rod 206 of the familiar key-releasing bail 207.

It will be understood from what has already been stated that in the case of registration of an amount exceeding $9.99, thus calling for a fee running to tens, it will be necessary to extend the setting up of stop devices to the tens bank or order of the fee department of the machine and as the digits vary both in the units and tens orders besides which ciphers may be required, a control of the two orders for recording and registering in the fee department of the machine must be permutable in character. For example the fee amount may be .12 or it may be .21. When the fee runs to tens the third bank or order of amount keys no longer functions in the matter of setting stops in the fee department of the machine but the control passes to the keys of the fourth bank or order and the single key of the fifth order. Here it may be mentioned that the cross-rods $200^a$ do not as is generally the case extend entirely across the machine but those pertaining to the keys of the units, tens and hundreds orders and numbered from 1 to 7 terminate a short distance to the left of the hundreds bank as illustrated in Fig. 2 and the cross-rod pertaining to the 9 keys of said orders terminates somewhat closer to said hundreds order of keys. The cross-rod 201 is the only one that extends entirely across the machine. The reason for this is that as to keys of the fourth bank or order from 1 to 8 their bell crank levers instead of being loosely mounted upon cross-rods are mounted upon rock shafts so that the requisite control may be had over the stops which come into play for positioning the accounting elements in the fee department of the machine. The 9 key of the fourth order also has a function to perform in this regard but it operates through the medium of the rock shaft on which the bell crank for the 8 key is mounted. Therefore the 9 key bell crank can be loosely mounted as usual upon a cross-rod extending from side to side of the machine, to-wit the cross-rod 201.

Now referring to the registration of $10 or any amount above that up to $20, for which the fee is .10, it will be obvious that the tens order lever 611 of the fee department of the machine must move so as to bring the 1 type to the printing line and lower its rack $610^c$ one step, and besides this it will be necessary to set a zero stop for the rack $610^a$ of the units order since the zero or cipher type in that order would not be set in the ordinary manner because the latch $415^a$ will have been withdrawn by depression of amount keys and so cannot serve as is usual with such a latch to block the descent of the rack and so limit the movement of the lever to that permitted by the familiar slot in the rack. All of this must necessarily be under control of the 1 key in the fourth bank since that is the only key depressed in the case of a registration of $10 and in the case of registration of higher amounts up to but not including $20 the depression of keys in the lower orders has no effect upon the fee department stops. (It will be hereinafter explained how the stop arm A is put out of commission altogether whenever a key is depressed in the fourth order). The 1 key of the fourth order is connected to a rock shaft $200^d$ and there is mounted to slide upon that rock shaft and others hereinafter designated a slotted bar B (Fig. 9), which bar has at its front end a depending arm $b$ to which is fastened a stop wire $270^a$ similar to the familiar stop wires employed in Burroughs machines, but in the present instance engaging a slot of the guide plate 210 practically flush as to its upper edge with the stop shoulder of the rack $610^a$ so that when said stop wire is drawn rearward it will obstruct the rack and hold it in its normal position, thereby limiting the movement of the lever $611^a$ to one step for positioning the zero type at the printing line. There is secured to the rock shaft $200^d$ in the units order of the fee department a bell crank lever $217^d$ having a stud $b'$ which extends in front of the aforesaid depending arm $b$ of the slide bar B. Obviously depression of the 1 key in the fourth bank will therefore cause rearward movement of said slide bar and the setting of the zero stop wire. The said rock shaft $200^d$ extends on to the tens order in the fee department of the machine and for the purpose of setting up the 1 key in that order it has affixed to it an arm $200^e$ (Fig. 15) with a laterally bent lower end extending in front of a depending lug $c$ on a slide plate C which is slotted to embrace the rock shaft and others hereinafter specified. This slide bar has a depending arm $c'$ to which is coupled a stop wire $270^b$ whose arrangement at the forward end is the same as any 1 stop wire in a Burroughs machine. The positioning of this stop wire, due to depression of the 1 key in the fourth bank, will obviously result in properly measuring the descent of the rack $610^b$ for registering 1 in the tens order and setting up the corresponding 1 type. Here a slide strip $214^b$ performs the usual function of withdrawing a latch 415 to release the rack 610$^b$. However, the slide strip instead of being moved rearward by key bell cranks is so moved by the depending arm $c'$ of the slide bar C and by other devices hereinafter specified, said arm extending through a slot in the slide strip.

For all amounts exceeding $9.99 and up to $50 the tens digit of the fee is the same, to-wit 1. Therefore the slide bar C is common to the 1, 2, 3 and 4 keys of the fourth order. Thus the 2, 3 and 4 keys of that order operate upon bell cranks 217$^f$ 217$^g$ and 217$^h$ which are secured respectively to rock shafts 200$^f$, 200$^g$ and 200$^h$ and these rock shafts have depending arms $c^2$, $c^3$ and $c^4$ similar to the arm 200$^e$ and two of them engaging depending lugs $c^5$ and $c^6$ of the slide bar C similar to the lug $c$, and the arm $c^3$ engaging the depending arm $c'$ of said slide bar. Obviously, therefore, the effect is the same whether the 1, 2, 3 or 4 key of the fourth bank is depressed, so far as concerns the tens fee order. However, as to amounts greater than $9.99 and up to but not including $30 the zero or cipher stop should not be set in the units bank and the cipher type brought to the printing line, for the fee for such amounts is .12 and so a 2 stop should be set in the units order. Obviously any such amount calls for depression of the 2 key in the fourth bank. Consequently it is merely necessary to provide for the setting of said 2 stop by the depression of said 2 key. To this end the rock shaft 200$^f$ carries a bell crank 217$^f$ in the fee units order, which bell crank is connected to a stop wire 270$^c$, as shown in Fig. 9, said stop wire being arranged at its forward end just the same as any 2 stop wire in a Burroughs machine. Obviously, therefore, depression of the 2 key in the fourth bank will result in descent of the units rack bar 610$^a$ the proper distance.

If the amount exceeds $29.99 and is less than $40 then of course the 3 key in the fourth bank is depressed, and this should change the fee unit to 5. To this end the rock shaft 200$^g$ carries a bell crank lever 217$^g$ which is connected to a stop wire 270$^d$, the latter at its forward end being arranged and functioning the same as any 5 stop wire in a Burroughs machine. If the amount is higher than $39.99 but less than $50 the 4 key in the fourth bank would be the one depressed and the fee unit should be changed to 8. Consequently the rock shaft 200$^h$ carries a bell crank lever 217$^h$ to which is connected a stop wire 270$^e$ arranged and functioning at its forward end the same as any 8 stop wire in a Burroughs machine.

Now when the amount exceeds $49.99 the tens unit changes to 2 and remains so up to and including $79.99. Consequently another stop must come into play in the tens fee order but obviously the same stop will serve under control of the 5, 6 and 7 keys of the fourth bank. In this connection a construction is employed similar to that described in connection with the 1 stop wire 270$^b$ for the tens fee bank. A slotted slide bar D is mounted upon rock shafts 200$^i$, 200$^j$ and 200$^k$ to which bell cranks 217$^j$ are secured respectively, said bell cranks being acted upon by said 5, 6 and 7 keys respectively. This slide bar D has a depending arm $d$ extending through a slot in the slide strip 214$^b$ and being connected with a stop wire 270$^f$ which is arranged and functions at its forward end in connection with the tens rack 610$^b$ the same as any 2 stop wire in a Burroughs machine. Each of the rock shafts last mentioned has a depending arm $d'$ similar to the arms $c^2$, $c^3$ and $c^4$ previously described, two of which arms $d'$ act upon depending lugs $d^2$ respectively of the slide bar D and the third of which arms similarly acts upon the depending arm $d$ of said slide bar. In case of depression of the 5 key in the fourth bank the fee unit should be 1. Therefore the rock shaft 200$^i$ carries a bell crank 217$^k$ having attached to it a stop wire 270$^k$ in the units fee order and arranged and functioning at its forward end the same as any 1 stop wire in a Burroughs machine, see Fig. 9. When the amount calls for depression of the 6 key in the fourth bank the fee unit should change to 4. Consequently the rock shaft 200$^j$ carries a bell crank lever 217$^m$ to which is connected a stop wire 270$^m$ in the units fee order and arranged and functioning at its forward end the same as any 4 stop wire in a Burroughs machine. If the amount calls for depression of the 7 key in the fourth bank the fee unit should change to 7. Consequently the rock shaft 200$^k$ carries a bell crank lever 217$^n$ to which is attached a stop wire 270$^n$ functioning in the fee units order the same as any 7 stop wire in a Burroughs machine.

With regard to any amount in excess of $79.99 and up to and including $100 the tens digit of the fee is the same, to-wit 3. Consequently the machine is so arranged that depression of the 8 or the 9 key in the fourth bank or depression of the single or 1 key in the fifth bank will have the same effect as to the tens order in the fee department, and inasmuch as the fee for all such amounts is .30 the zero or cipher stop in the units fee order should be common to said keys. It was before explained how the zero stop wire 270$^a$ would be set by depression of the 1 key and it may now be explained that the slide bar B also serves in case of depression of the 8 or the 9 key in the fourth bank, said slide bar extending rearward and being slotted to embrace all of the rock shafts so far designated and a rock shaft 200$^m$ pertaining to the 8 key. The slide bar also has a slotted rear end portion embracing the cross-rod 201, all of which clearly appears in Fig. 9. There is a bell crank lever 217º fastened to this rock shaft and it has a stud e extending in front of a lug b² of the said slide bar B. It will presently be explained how the rock shaft is turned by depression of either the 8 or the 9 key, and it will be obvious that this will result in forcing the slide bar B rearward and setting up the zero stop wire 270ª the same as similar movement of the slide bar produced by depression of the 1 key. It may be here noted that a spring f normally holds the said slide bar forward. As to the rocking of the shaft by depression of either the 8 or the 9 key reference should be had especially to Figs. 7, 13, 14 and 14ª. The rock shaft has affixed to it a shouldered collar g and there is loosely mounted upon the rock shaft a bell crank 217ᵖ for the 8 key to act upon, said bell crank having a shouldered hub g' to act upon the collar g, there being clearance to provide for the rocking of the shaft independently of said bell crank lever, to-wit by depression of the 9 key. The latter operates upon a bell crank lever 217ᵠ loosely mounted on the cross-rod 201 and having coupled to it a link h which is slotted at its forward end to embrace a stud g² carried by a crank arm g³ which is unified with the aforesaid collar g. Obviously the slot in the link provides for the rocking of the collar and shaft without affecting the bell crank 217ᵠ, see Fig. 14. At the same time it is equally obvious that depression of the 9 key will, through the medium of said bell crank and said link, rock the collar and shaft without affecting the bell crank 217ᵖ, see Fig. 13. The setting of a stop in the tens order for the .30 fee is also done through the medium of the rock shaft 200ᵐ. Thus it carries an arm 217ʳ connected to a stop wire 270ʳ which at its forward end is arranged and functions the same as any 3 stop wire in a Burroughs machine. It will of course be understood that the effect is the same whether the 8 or the 9 key be depressed in the fourth bank.

In the matter of the 1 key in the fifth bank it will be understood that it is required to control the setting of stops for the fee the same as said 8 and 9 keys. As to the setting of the 3 stop wire 270ʳ the rock shaft 200ᵐ carries an arm m (Fig. 8) engaging a slot in the slide strip 214ᵐ pertaining to said fifth order key. It will be understood that the latter operates as usual upon a bell crank lever 217ˢ which engages a slot in said slide strip. Consequently depression of the key will result in the rocking of the shaft 200ᵐ and setting the 3 stop wire. In this connection it should be explained that the lost motion between the said rock shaft and the bell crank 217ᵖ pertaining to the 8 key of the fourth bank, should be sufficient to provide for the rocking of the shaft by the 1 key of the fifth bank without operating said bell crank. The said bell crank lever 217ˢ is of course loose on the rock shaft 200ᵈ, but nevertheless it will serve for the setting of the same zero stop that is set by the rocking of said shaft, for it will be remembered that the rocking of the shaft 200ᵐ also sets that zero stop, and as has already been explained said rock shaft 200ᵐ is operated through the medium of the slide strip 214ᵐ pertaining to the key of the fifth bank.

It remains to explain how the differential stop arm A is disabled or put out of commission when any key of the fourth bank or the single key of the fifth bank is operated. It will be noted that whenever any one of these keys is operated the fee units rack 610ª must be released. This is effected in the customary way through the medium of a slide strip 214ⁿ which engages the latch 415. This slide strip, which for the latch-releasing purpose is engaged as usual by the various special bell crank levers of the fee units order (217ᵈ, 217ᶠ, 217ᵍ, 217ʰ, 217ᵏ, 217ᵐ, 217ⁿ, 217º) and also by the arm b of the slide strip B, is utilized for the purpose above mentioned, to-wit that of disabling the differential stop arm A. As before stated the latter is secured to a sleeve A' loose on the cross-rod 201. There is also secured to this sleeve an arm A⁵ which engages a slot in said slide strip 214ⁿ, see particularly Fig. 6. The relation is such of course as to provide for the shifting of the stop arm between the three positions heretofore mentioned, without any obstruction being offered by the slide strip 214ⁿ. At the same time the rearward movement of the latter is such as to move the said arm so far rearward as to take it entirely out of the path of the stud 611ᵇ.

It will now be clear that the above-described construction is well adapted for carrying out the object first stated, but of course it is to be understood that the invention is not necessarily limited to this particular construction and that it may be utilized for different classes of work.

What I claim is;

1. In a machine of the class described, the combination of two accumulating departments each having a distinct set of differentially operable elements, and common means for differentially controlling the operable elements of the two sets to accumulate different amounts in the two departments by the same operation of said means.

2. In a machine of the character described, the combination of two accumulating departments each including a set of accounting elements and amount determining means therefor variously settable to differentially measure movements of accounting elements and common means for differentially controlling the amount determining means in the respective accumulating departments whereby to accumulate different amounts in the two departments by the same operation of said means.

3. In a machine of the character described, the combination with accounting mechanism, of amount-determining mechanism divided into two departments one of which is equipped with manipulating devices, and connections for selectively and differentially setting amount-determining elements of the other department by the use of said manipulating devices.

4. In a machine of the character described, the combination of reciprocatory accounting elements in two departments, a differential stop for measuring movement of a reciprocatory element of one such department, and manipulative devices for differentially measuring movements of a reciprocating element of the other of such departments, said manipulative devices variously positioning the aforesaid differential stop.

5. In a machine of the character described, the combination of two departments of reciprocatory accounting elements, manipulative amount-determining devices for the accounting elements of one department, stop-devices for measuring movements of accounting elements of the other department and controlling connections from the manipulative devices to the last-mentioned stop-devices for permutably setting the latter.

6. In a machine of the character described, the combination of two departments of reciprocatory accounting elements, manipulative amount-determining devices for the accounting elements of one department, a plurality of movable stops for measuring movements of accounting elements of the other department, and connections from the aforesaid manipulative means for selectively setting the movable stops.

7. In a machine of the character described, the combination of two departments of reciprocatory accounting elements, manipulative amount-determining devices for the accounting elements of one department, two series of movable stops for measuring movements of different accounting elements of the other department, and connections from the aforesaid manipulative means for permutably setting movable stops of the said two series.

8. In a machine of the character described, the combination of reciprocatory accounting elements in two departments, a differential stop for measuring movement of a reciprocating element of one such department, two series of movable stops, the one for measuring movements of said accounting element and the other for measuring movements of another accounting element of the same department, manipulative amount-determining devices for differentially measuring movements of accounting elements of the other department, connections from the manipulative devices associated with one of such latter elements for variously positioning the aforesaid differential stop, connections from the manipulative devices associated with another of the accounting elements of said latter department for permutably setting the stops of the two aforesaid series, and means for disabling the differential stop when so setting stops of said series.

9. In a machine of the character described, the combination of reciprocatory accounting elements in two departments, latches for normally restraining said elements, a differential stop for measuring movement of a reciprocatory element of one such department, and manipulative devices for differentially measuring movements of a reciprocating element of the other of such departments, said manipulative devices variously positioning the aforesaid differential stop and disabling the latch which normally restrains the accounting element associated with said stop.

10. In a machine of the character described, the combination of reciprocatory accounting elements in two departments, latches for normally restraining said elements, a differential stop for measuring movement of a reciprocating element of one such department, two series of movable stops, the one for measuring movements of said accounting element and the other for measuring movements of another accounting element of the same department, manipulative amount-determining devices for differentially measuring movements of accounting elements of the other department, connections from the manipulative devices associated with one of such latter elements for variously positioning the aforesaid differential stop, connections from the manipulative devices associated with another of the accounting elements of said latter department for permutably setting the stops of the two aforesaid series, means for disabling the differential stop when so setting stops of said series, and means operated by the manipulative amount-determining devices for disabling the latch of the accounting element associated with said differential stop.

11. In a machine of the character described, the combination of two departments of reciprocatory accounting elements; depressible keys and connected stops for variously determining extent of movement of accounting elements of one department; a differential stop for determining extent of movement of an accounting element of the other department; an indexing member for fixing the position of said stop; and means for differently positioning said indexing member by depression of keys associated with one of the accounting elements of the first-specified department.

12. In a machine of the character described, the combination of two departments of reciprocatory accounting elements; depressible keys and connected stops for variously determining extent of movement of accounting elements of one department; a spring-actuated differential stop for determining extent of movement of an accounting element of the other department; an indexing member for variously limiting movement of the differential stop under spring-actuation; and means for differently positioning said indexing member by depression of keys associated with one of the accounting elements of the first-specified department.

13. In a machine of the character described, the combination of two departments of reciprocatory accounting elements; depressible keys and connected stops for variously determining extent of movement of accounting elements of one department; a pivoted spring-actuated stop-piece having steps or shoulders to engage an accounting element of the other department, and having a stepped arm; an indexing bail having a stud engaging said arm; a multi-shouldered thrust-bar engaging said bail; and key-studs of the keys associated with one of the accounting elements of the first-specified department, which key-studs are operatively related to shoulders of said thrust-bar with provisions for differential movement of the same through depression of different keys.

14. In a machine of the character described, the combination of two departments of reciprocatory accounting elements; depressible keys and connected stops for variously determining extent of movement of accounting elements of one department; a pivoted spring-actuated stop-piece having steps or shoulders to engage an accounting element of the other department, and having a stepped arm; an indexing bail having a stud engaging said arm; a multi-shouldered thrust-bar engaging said bail; key-studs of the keys associated with one of the accounting elements of the first-specified department, which key-studs are operatively related to shoulders of said thrust-bar with provisions for differential movement of the same through depression of different keys; a series of movable stops for the same accounting element with which the said pivoted stop-piece is associated; connections from another series of depressible keys, for setting said stops; and means for displacing the stop-piece when a key of such other series is depressed.

15. In a machine of the character described, the combination of two departments of reciprocatory accounting elements; depressible keys and connected stops for variously determining extent of movement of accounting elements of one department; a pivoted spring-actuated stop-piece having steps or shoulders to engage an accounting element of the other department, and having a stepped arm; an indexing bail having a stud engaging said arm; a multi-shouldered thrust-bar engaging said bail; key-studs of the keys associated with one of the accounting elements of the first-specified department, which key-studs are operatively related to shoulders of said thrust-bar with provisions for differential movement of the same through depression of different keys; a series of movable stops for the same accounting element with which the said pivoted stop-piece is associated; connections from another series of depressible keys, for setting said stops; and a slide strip operatively related to the said series of movable stops and engaged with said stop-piece.

16. In a machine of the character described, the combination of two departments of reciprocatory accounting elements; depressible keys and connected stops for variously determining extent of movement of accounting elements of one department; a pivoted spring-actuated stop-piece having steps or shoulders to engage an accounting element of the other department, and having a stepped arm; an indexing bail having a stud engaging said arm; a multi-shouldered thrust-bar engaging said bail; key-studs of the keys associated with one of the accounting elements of the first-specified department, which key-studs are operatively related to shoulders of said thrust-bar with provisions for differential movement of the same through depression of different keys; a series of movable stops for the same accounting element with which the said pivoted stop-piece is associated; a series of movable stops for a second accounting element of the second-specified department; connections from a higher order series of depressible keys than that above-specified, for permutably setting stops of said two series; and means for displacing the stop-piece when a key of such high order series is depressed.

17. In a machine of the character described, the combination of two departments of reciprocatory accounting elements; depressible keys and connected stops for variously determining extent of movement of accounting elements of one department; a pivoted spring-actuated stop-piece having steps or shoulders to engage an accounting element of the other department, and having a stepped arm; an indexing bail having a stud engaging said arm; a multi-shouldered thrust-bar engaging said bail; key-studs of the keys associated with one of the accounting elements of the first-specified department, which key-studs are operatively related to shoulders of said thrust-bar with provisions for differential movement of the same through depression of different keys; a series of movable stops for the same accounting element with which the said pivoted stop-piece is associated; a series of movable stops for a second accounting element of the second-specified department; connections from a higher order series of depressible keys than that above specified, for permutably setting stops of said two series; and a slide-strip operatively related to one of said series of movable stops and engaged with said stop-piece.

18. In a machine of the character described, the combination of two departments of reciprocatory accounting elements; depressible keys and connected stops for variously determining extent of movement of accounting elements of one department; two series of stop-wires for different accounting elements of the other department; rock-shafts operated by depressible keys of a certain order, certain of said shafts being cranked to the stop-wires of one of the aforesaid two series and one to a stop-wire of the other series; and a bar connected to another stop-wire of the first series and operated by another of the rock-shafts and also by the rock-shaft which is cranked to the stop-wire of the other series.

19. In a machine of the character described, the combination of two departments of reciprocatory accounting elements; depressible keys and connected stops for variously determining extent of movement of accounting elements of one department; two series of stop-wires for different accounting elements of the other department; rock-shafts operated by depressible keys of a certain order, certain of said shafts being cranked to the stop-wires of one of the aforesaid two series and one to a stop-wire of the other series, and two keys of said order adapted to independently operate said latter rock-shaft; and a bar connected to another stop-wire of the first series and operated by another of the rock-shafts and also by the rock-shaft which is cranked to the stop-wire of the other series.

20. In a machine of the character described, the combination of two departments of reciprocatory accounting elements; depressible keys and connected stops for variously determining extent of movement of accounting elements of one department; two series of stop-wires for different accounting elements of the other department; rock-shafts operated by depressible keys of a certain order, one of said rock-shafts having a shouldered collar and the stop connections of two of the depressible keys of said series including bell-crank levers, one having a hub shouldered to engage said shouldered collar and a crank arm, and the two being connected by a link slotted for engagement with said crank-arm; a crank-arm on said rock-shaft connected to a certain stop-wire of one of the above-mentioned series; crank-arms on others of said rock-shafts connected respectively with stop-wires of the other series; and a bar connected to another stop-wire of the latter series and operated by another of the rock-shafts and also by the first-specified rock-shaft.

21. In a machine of the character described, the combination of two departments of reciprocatory accounting elements; depressible keys and connected stops for variously determining extent of movement of accounting elements of one department; two series of stop-wires for different accounting elements of the other department; rock-shafts operated by depressible keys of a certain order, certain of said shafts being cranked to the stop-wires of one of the aforesaid two series and one to a stop-wire of the other series; and a bar connected to another stop-wire of the first series and operated by another of the rock-shafts and also by the rock-shaft which is cranked to the stop-wire of the other series and said bar adapted also to be operated by a key of a higher order.

22. In a machine of the character described, the combination of two departments of reciprocatory accounting elements; depressible keys and connected stops for variously determining extent of movement of accounting elements of one department; two series of stop-wires for different accounting elements of the other department; rock-shafts operated by depressible keys of a certain order, certain of said shafts being cranked to the stop-wires of one of the aforesaid two series and one to a stop-wire of the other series; and a bar connected to another stop-wire of the first series and operated by another of the rock-shafts and also by the rock-shaft which is cranked to the stop-wire of the other series and other wires of the latter series being operatively connected to groups of the rock-shafts.

23. In a machine of the character described, the combination of two departments of reciprocatory accounting elements; depressible keys and connected stops for variously determining extent of movement of accounting elements of one department; two series of stop-wires for different accounting elements of the other department; rock-shafts operated by depressible keys of a certain order, certain of said shafts being cranked to the stop-wires of one of the aforesaid two series and one to a stop-wire of the other series; a bar connected to another stop-wire of the first series and operated by another of the rock-shafts and also by the rock-shaft which is cranked to the stop-wire of the other series; and bars connected respectively to the other wires of the latter series and each operated upon by any one of a group of rock-shafts, there being a separate group for each of said stop-wires.

24. In a machine of the character described, the combination of two departments of reciprocatory accounting elements; depressible keys and connected stops for variously determining extent of movement of accounting elements of one department; two series of stop-wires for different accounting elements of the other department; rock-shafts operated by depressible keys of a certain order, certain of said shafts being cranked to the stop-wires of one of the aforesaid two series and one to a stop-wire of the other series; a bar connected to another stop-wire of the first series and operated by another of the rock-shafts and also by the rock-shaft which is cranked to the stop-wire of the other series; bars connected respectively to the other wires of the latter series; operating arms on a group of the rock-shafts and each independently engaging one of said bars; and operating arms on another group of the rock-shafts and each independently engaging the other of said bars.

25. In a computing machine, the combination of two type setting and recording mechanisms, manual means for actuating one of said mechanisms, said manually actuated mechanism being adapted to set up and record successively items of a plurality of classes, each class containing a plurality of different items having, in some cases at least, a plurality of digits, and means whereby the other mechanism is controlled by said manually actuated mechanism so that when said manual actuating means records an item of a given class, a secondary item corresponding to that class is recorded by said other mechanism, the corresponding secondary items for different classes being different.

26. In an adding machine, means for indicating principal amounts comprising a plurality of indicating members, a separate set of manually-operated keys and stops for each of said members, and means for indicating fees comprising an indicating member, a stop therefor, and means whereby when one of said keys is depressed the last mentioned stop will be set.

27. In an adding machine, means for indicating principal amounts comprising a plurality of indicating members, manually-operated groups of keys and stops for controlling said members, and means for indicating fees comprising indicating members, stops therefor, and means whereby each group of keys selectively controls and operates one or more of the last mentioned stops.

28. The combination with an adding machine comprising sections for recording amounts in separate columns, of means controlled by keys of one section for setting stops to control a printing member or members of another section.

29. In a computing machine, the combination of two type setting mechanisms, manual means for actuating one of said mechanisms, said manually actuated mechanism being adapted to set up a plurality of classes of items, each class containing a plurality of different items having, in some cases at least, a plurality of digits, means whereby the other mechanism is actuated by said manually actuated mechanism so that when said manually actuated mechanism records an item of a given class, an item corresponding to that class is recorded by said other mechanism, the corresponding items for different classes being different, and means for separately accumulating the items set up by the two mechanisms.

30. In a computing machine, the combination of two type setting mechanisms, manual means for actuating one of said mechanisms, said manually actuated mechanism being adapted to set up a plurality of classes of items, each class containing a plurality of different items having, in some cases at least, a plurality of digits, means whereby the other mechanism is actuated by said manually actuated mechanism so that when said manually actuated mechanism records an item of a given class, an item corresponding to that class is recorded by said other mechanism, the corresponding items for different classes being different, and means for printing in separate columns the items set up by both mechanisms.

31. In a computing machine, the combination of two type setting mechanisms, manual means for actuating one of said mechanisms, said manually actuated mechanism being adapted to set up a plurality of classes of items, each class containing a plurality of different items having, in same cases at least, a plurality of digits, means whereby the other mechanism is actuated by said manually actuated mechanism so that when said manually actuated mechanism records an item of a given class, an item corresonding to that class is recorded by said other mechanism, the corresponding item for different classes being different, means for separately accumulating the items set up by the two machines, and means for printing in separate columns the items set up by both mechanisms.

32. In a computing machine, the combination of two type setting mechanisms, manual means for actuating one of said mechanisms, said manually actuated mechanism being adapted to set up a plurality of classes of items, each class containing a plurality of different items having, in some cases at least, a plurality of digits, means whereby the other mechanism is actuated by said manually actuated mechanism so that when said manually actuated mechanism records an item of a given class, an item corresponding to that class is recorded by said other mechanism, the corresponding items for different classes being different, means for separately accumulating the items set up by the two mechanisms, and means for printing the respective totals of the items set up by the two mechanisms.

33. In a computing machine, the combination of two type setting mechanisms, manual means for actuating one of said mechanisms, said manually actuated mechanism being adapted to set up a plurality of classes of items, each class containing a plurality of different items having, in some classes at least, a plurality of digits, means whereby the other mechanism is actuated by said manually actuated mechanism so that when said manually actuated mechanism records an item of a given class, an item corresponding to that class is recorded by said other mechanisms, the corresponding items for different classes being different, means for separately accumulating the items set up by the two machines, means for printing in separate columns the items set up by both mechanisms, and means for printing the respective totals of the items set up by the two mechanisms.

JESSE G. VINCENT.

Witnesses:
ARTHUR W. HENZEL,
EMMA L. BURGESS.